(No Model.) 2 Sheets—Sheet 1.
W. W. FICHTENBERG.
NECK WEAR HOOK.
No. 274,924. Patented Apr. 3, 1883.
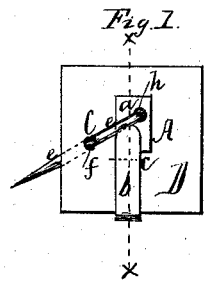
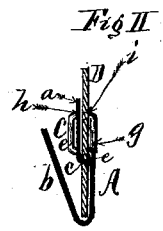
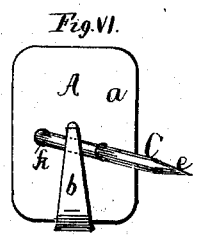
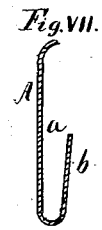
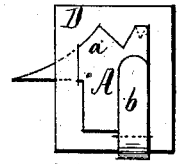
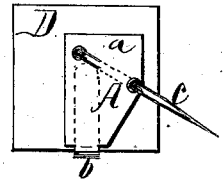
Witnesses:
J. Barritt
Fred K B Swift
Inventor:
Werner W. Fichtenberg
Per:
J. Barritt
Atty (No Model.) 2 Sheets—Sheet 2.
W. W. FICHTENBERG.
NECK WEAR HOOK.
No. 274,924. Patented Apr. 3, 1883.
Fig. VIII.
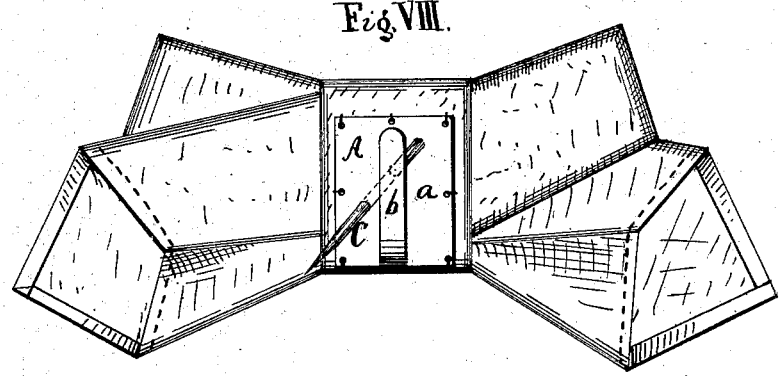
Witnesses:
F. Barrett.
Fredk B. Staft.
Inventor:
Werner W. Fichtenberg
Per:
F. Barrett
Atty.

UNITED STATES PATENT OFFICE.

WERNER W. FICHTENBERG, OF NEW YORK, N. Y.

NECK-WEAR HOOK.

SPECIFICATION forming part of Letters Patent No. 274,924, dated April 3, 1883.

Application filed January 5, 1883. (No model.)

*To all whom it may concern:*

Be it known that I, WERNER W. FICHTENBERG, of the city, county, and State of New York, have invented a certain new and useful Improvement in Hooks for Neck-Wear; and I do hereby declare that the following is a clear and exact description of the same, reference being had to the accompanying drawings, forming a part of this specification.

The object of my invention is to produce a simply-constructed hook for neck-wear which will prevent the scarf or bow, with or without bands, from becoming accidentally displaced; also, in a hook which will serve as a shield; also, in a novel device for fastening the said hook onto a separate shield.

Referring to the drawings, Figure 1 is a front view of my improved hook attached to a shield of a neck-wear scarf or bow. Fig. 2 is a sectional view through line $x\,x$, Fig. 1. Fig. 3 is a plan view of the hook before being placed on the shield and formed up into shape. Figs. 4 and 5 show modifications of my improved hook attachment. Figs. 6 and 7 are front and end views of my improved hook in another modified form, shaped to its adaptation as a combined shield and hook. Fig. 8 is a rear view of Fig. 6 modification, showing it attached to a neck-wear bow.

A represents the hook, made of any material or metal. It may be made of the shape shown in Fig. 3. The hook A consists of the body $a$ and tongue-piece $b$, formed out of the body $a$. The hook A, when stamped out, as shown, is laid on one side of the shield D. (See Fig. 1.) When the hook is being placed onto the shield the tongue-piece $b$ is passed through the slot $c$ in the shield to the other side of the same. (See Fig. 2.) When the hook is placed upon the shield in the above-described manner it is held thereto by the pin C. This is done in the following-described manner: The end $e$ of pin C, which may consist of a piece of wire, or a common pin with the head cut off, is first passed through hole $f$ in the shield D. The other end, $g$, is then bent down and passed through the hole $h$, cut in the body $a$ of the hook A; also through hole $i$ in the shield, after which it is bent down by pressure even with the shield. (See Fig. 2.)

The end $e$ extends a little distance from the shield, and is pointed. The end $e$, when thus pointed, is used as a pin for holding the band of a scarf or bow. (See Fig. 1.) By this arrangement the hook is firmly and simply held to the shield, and at the same time serves as a firm holder for the pin, when the same is used for holding the band. After the hook has been fastened on the shield, as hereinbefore described, the tongue-piece $b$ is then bent upward to form a hook, as shown in Fig. 2. The shield D, with the hook A thus attached, is then fastened to a scarf or bow in the usual manner.

When the scarf or bow, with my improved hook attached thereto, is placed onto the wearer, the tongue-piece $b$ is passed under the collar, between the collar and shirt bands. By placing the hook in this position the scarf or bow is prevented from moving upward and displacing itself.

Fig. 4 shows a modification of the construction of the hook, wherein the means of fastening are formed out of the metal out of which the hook is formed.

Fig. 5 shows another modification of the hook, which is the same as shown in Fig. 1, with the exception that the body $a$ is wider and has two holes instead of one.

Fig. 6 represents another modification. It consists of enlarging the body $a$, so as to form a shield of itself, and it may be fastened to the bow, independent of the shield D, (see Fig. 8,) in any manner.

Having thus described my invention, I desire to claim—

1. The hook A, consisting of the body $a$, provided with holes, and the tongue-piece $b$, in combination with the pin or wire C and shield D, substantially as and for the purpose set forth.

2. The hook A, consisting of the body $a$, provided with holes, and the tongue-piece $b$, in combination with a bow or scarf, substantially as and for the purpose set forth.

WERNER W. FICHTENBERG

Witnesses:
F. BARRETT,
A. TAYLOR.